(12) United States Patent
Golub et al.

(10) Patent No.: US 8,986,411 B2
(45) Date of Patent: Mar. 24, 2015

(54) MODULAR PULSE JET FABRIC FILTER

(71) Applicant: Clyde Bergemann Power Group Americas, Atlanta, GA (US)

(72) Inventors: Gregory J. Golub, Athens, GA (US); Gregory C. Swartz, Severna Park, MD (US); Mark Steven Dutchess, Lebanon, PA (US)

(73) Assignee: Clyde Bergemann Power Group Americas Inc., Atlanta, GA (US)

( * ) Notice: Subject to any disclaimer, the term of this patent is extended or adjusted under 35 U.S.C. 154(b) by 0 days.

(21) Appl. No.: 13/748,651

(22) Filed: Jan. 24, 2013

(65) Prior Publication Data
US 2014/0202122 A1    Jul. 24, 2014

(51) Int. Cl.
| B01D 46/02 | (2006.01) |
| B01D 46/00 | (2006.01) |
| F23J 15/02 | (2006.01) |
| E04B 1/343 | (2006.01) |
| E04B 1/68  | (2006.01) |

(52) U.S. Cl.
CPC .......... B01D 46/0057 (2013.01); F23J 15/025 (2013.01); E04B 1/34331 (2013.01); E04B 1/68 (2013.01); B01D 46/0013 (2013.01); B01D 46/0068 (2013.01); B01D 46/02 (2013.01)
USPC ............. 55/341.5; 55/341.1; 55/361; 55/373; 29/428; 60/336

(58) Field of Classification Search
CPC ............... B01D 46/24–46/26; B01D 46/0057; B01D 46/0013; B01D 46/0068; B01D 46/02; F23J 5/025; E04B 1/34331; E04B 1/68
USPC ............... 55/341.1–341.7, 361–382; 60/336; 29/428; 52/741.1, 745.2
See application file for complete search history.

(56) References Cited

U.S. PATENT DOCUMENTS

| 3,289,370 | A  | * | 12/1966 | Van Etten ................. 52/309.11 |
| 3,951,628 | A  | * | 4/1976  | Eskijian .................... 55/300 |
| 4,904,287 | A  | * | 2/1990  | Lippert et al. ............. 55/302 |
| 2003/0177744 | A1 | * | 9/2003 | Gerakios et al. ........... 55/378 |
| 2010/0018173 | A1 |   | 1/2010 | Park et al. |
| 2010/0218469 | A1 | * | 9/2010 | Radaelli .................... 55/378 |

FOREIGN PATENT DOCUMENTS

GB            664235 A    1/1952

* cited by examiner

*Primary Examiner* — Thomas McKenzie
(74) *Attorney, Agent, or Firm* — Morris, Manning & Martin, LLP; Christopher W. Raimund

(57) ABSTRACT

A modular design for large pulse jet fabric filters (PJFF) is divided into similar compartments, which are each "shop-fabricated" in quarter sections prior to delivery to the power plant site. The quarter sections of the compartments are modular and sized so that they can be fabricated at a shop located away from the power plant site and transported by truck over public roads to the power plant site. Once delivered to the site, the quarter sections are bolted together and seal welded to form a PJFF compartment, without requiring additional internal fabrication or welding. The assembled compartment is then lifted onto the support structure as an assembled unit and bolted and/or welded in place. The additional components of the PJFF may also be shop-fabricated offsite to further the benefits of the modular design.

13 Claims, 3 Drawing Sheets

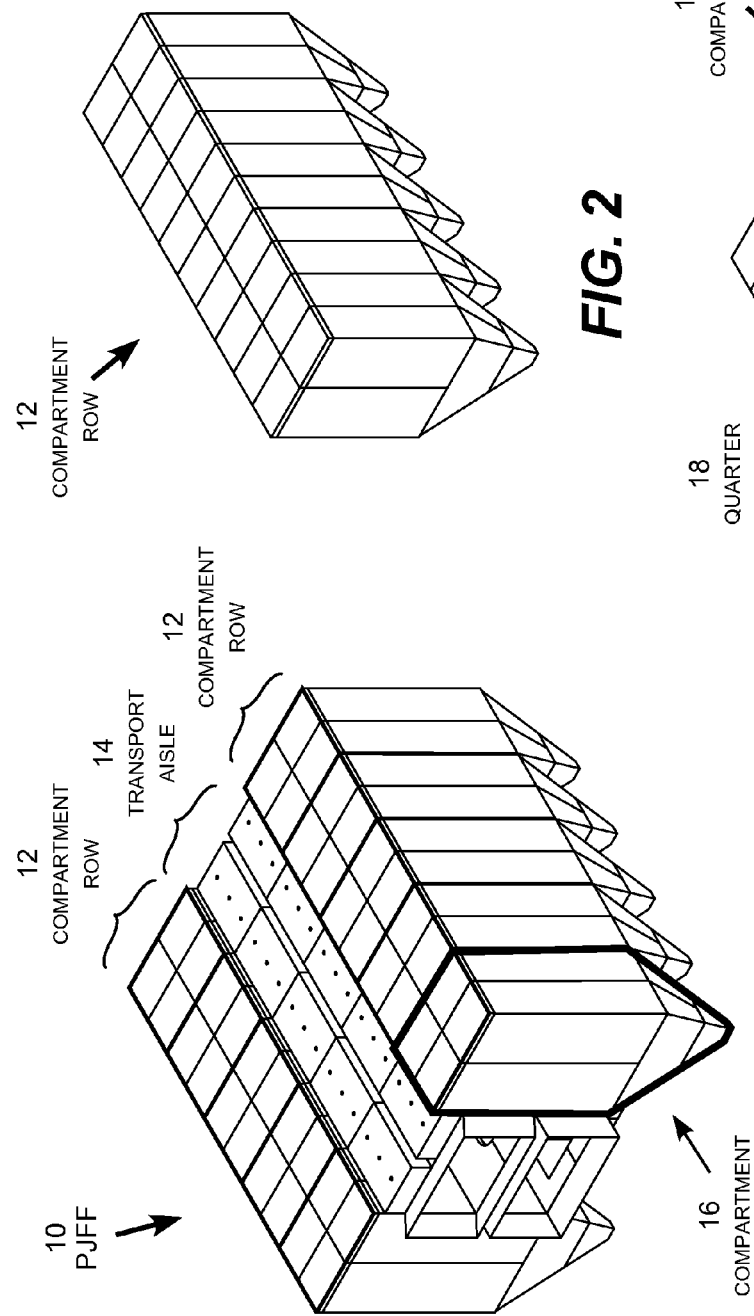
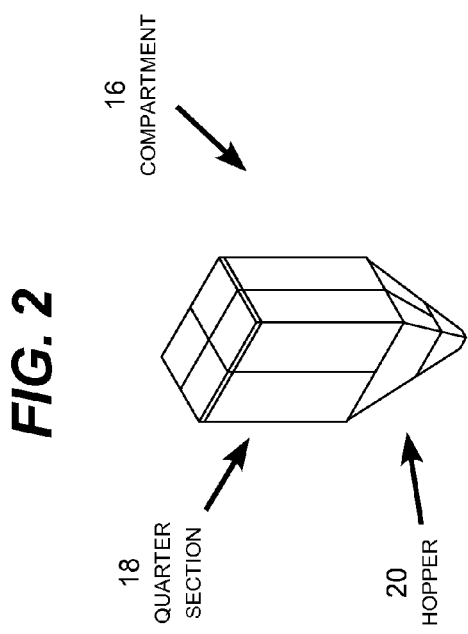

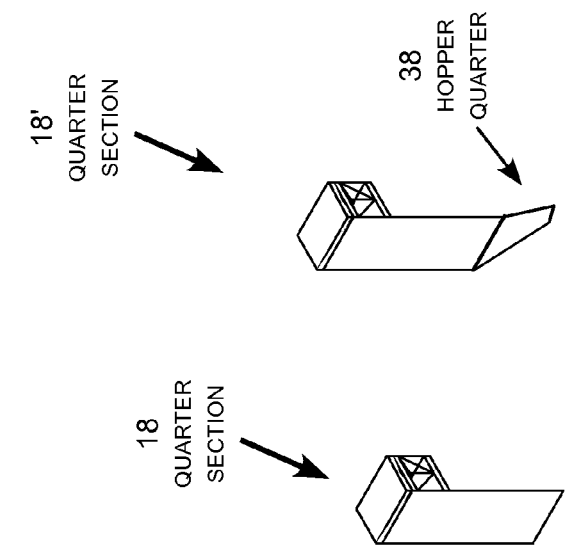
FIG. 5
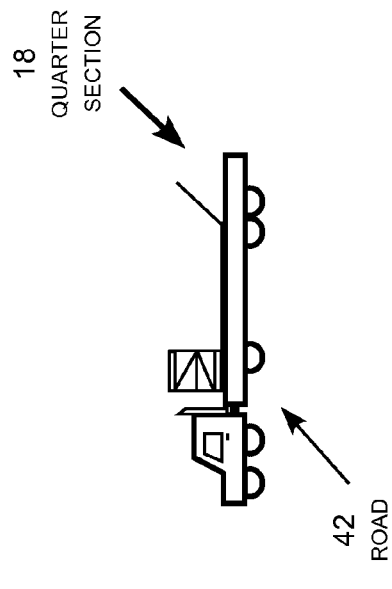
FIG. 6
FIG. 7
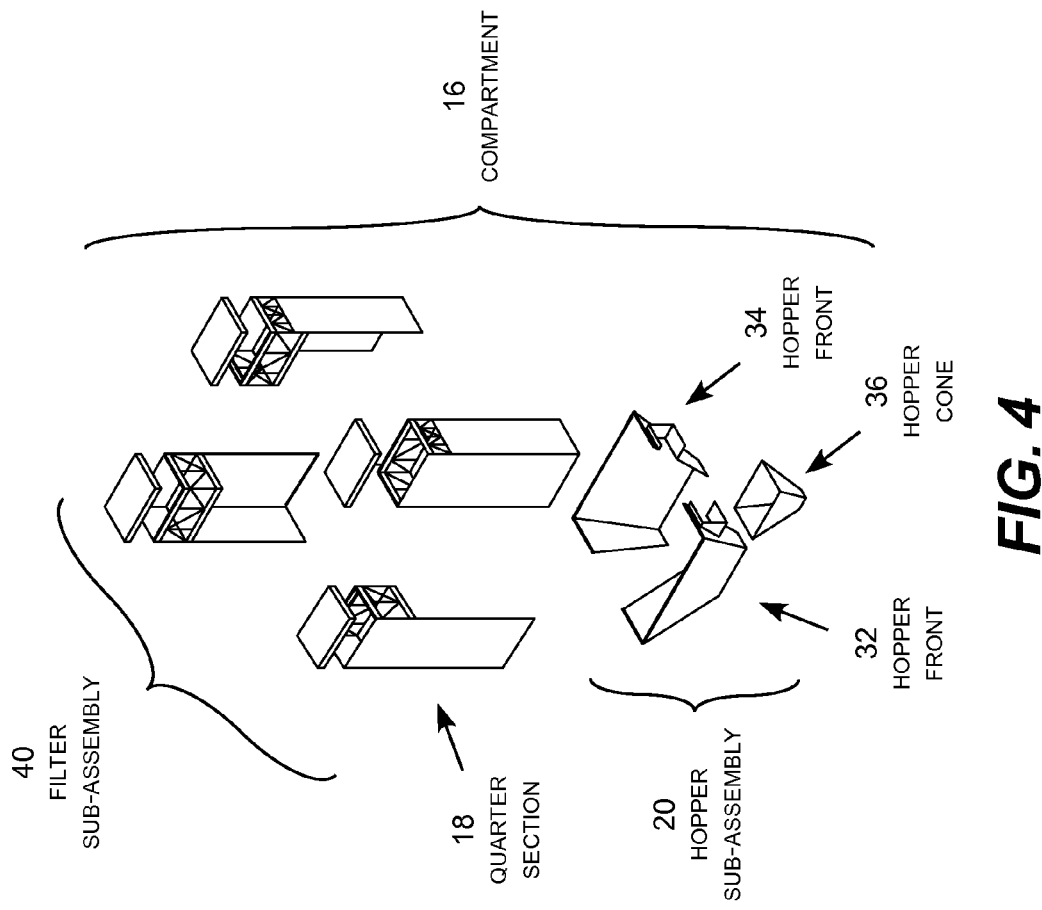
FIG. 4

MODULAR PULSE JET FABRIC FILTER

BACKGROUND

Pulse jet fabric filters (PJFFs) are industrial filter buildings located at coal-fired and other types of power plants that produce heave particulate loads in the furnace exhaust gas. The furnace may also be referred to as a boiler (even though the furnace need not generate steam for the present invention to be applicable), and the exhaust gas may be referred to as flue gas for descriptive convenience. The PJFF is used to remove the particulates from the flue gas as part of the "scrubber" exhaust air cleaning system. The PJFF typically contains thousands of long, tubular filter bags in the approximate range of 4 to 10 inches across and 15 to 33 feet (5 to 10 meters) long. The boiler exhaust gas is directed through the filters to remove the particulates from the flue gas, which fall into a hopper under the filter bags for removal and ultimate disposal via rail or truck cars. Each power plant may have multiple furnace units, each having a dedicated PJFF building located adjacent to the furnace for cleaning the flue gas from that particular unit prior to release into the atmosphere. Each PJFF usually includes thousands of individual filter bags and is typically organized into a number of compartments. Each compartment typically contains hundreds of individual filter bags discharging into a common hopper.

For example, an illustrative PJFF for one furnace unit of a commercial coal-fired power plant may include 10 compartments, each terminating in a dedicated hopper. Each compartment may include 816 tubular filter bags, for a total of 8,160 filters in the overall PJFF delivering particulates from the flue gas produced by its associated boiler through 10 hoppers for disposal. The overall PJFF structure typically weighs on the order of a thousand tons. The filter compartments may stand on the order of 40 feet tall, which the overall PJFF building standing on the order of 60 feet to 90 feet.

PJFFs are large industrial structures that are typically custom designed for each furnace unit and assembled on the power plant site. This requires cutting the source materials (such as large casing panels) to the desired sizes and structural welding of the various components in the field. On site construction disturbs the power plant and requires outdoor construction for an extended period of time. The conventional approach to PJFF fabrication includes shipping the large casing panels to the site, temporarily storing them onsite, and extensive cutting, fabrication and structural welding in the field. Field welding generally produces lower overall quality welding (over many welds) and higher costs than shop fabrication, where the environment is controlled and all necessary equipment is available and well-staged (e.g., railroad access, onsite inventory storage, overhead cranes, etc.) Conventional erection is comparatively ad hoc, often requires field modifications from initial plans, and requires many "lifts" by a large crane to position components for welding. This results in a relatively long erection time, particularly to cut the casing panels to size, position and structurally weld all of individual components in place.

Although certain PJFF components have been partially assembled off site in prior designs, the conventional practice is to perform most of the fabrication on site. This is a costly and time consuming process that disturbs the power plant site for an extended period, must typically be completed almost entirely outdoors, and requires locating specialized equipment on site for extended periods. A continuing need therefore exists for more cost effective and efficient approaches to PJFF fabrication.

SUMMARY OF THE INVENTION

This invention meets the needs described above through a modular design for large pulse jet fabric filters (PJFFs), such as those used at coal-fired and other types of power plants that produce heavy particulate loads in the flue gases (e.g., waste, wood, oil, etc.) The overall PJFF structure is divided into similar compartments, which are each "shop-fabricated" in quarter sections prior to delivery to the power plant site. Substantial cutting or internal welding of the individual quarter sections is not required at the job site prior to assembling the quarter sections together as part of the compartment. Each quarter section is modular and sized for transportation by truck over public roads to the job site to maximize fabrication at the well-equipped shop located away from the power plant site. Once delivered to the job site, the quarter sections are bolted together and seal welded to form substantially all or a portion of a PJFF compartment. The assembled compartment is then lifted into position on the support structure, where it is bolted and welded in place.

With the PJFF compartment broken down into road-transportable modular quarter sections, the remaining components of the PJFF (other than the base support structure and internal filters, equipment, and similar outfitting) can also be shop-fabricated offsite and delivered to the job site, likewise requiring only assembly with bolts and seal welds as part of field assembly. As a result, substantial cutting or internal welding is not required at the job site for any of the PJFF components prior to field assembly. The only field operations required include erecting the support structure, bolting and seal welding the pre-assembled quarter sections and any other components together to assemble the compartments, lifting the assembled compartments into place and attaching them to the support structure.

The quarter sections can therefore be efficiently fabricated at the off-site shop and transported to the job site where they are assembled to form the complete compartments. In cases where the transportation economics are in its favor, the ash hoppers may be shop-fabricated as part of the quarter sections. If this approach is not feasible, for example due to public road transportation length limitations, the hoppers are also fabricated in sections and shipped to the site, bolted and seal welded in place, without requiring additional structural welds in the field. Once the compartment has been assembled, it is lifted into position onto a structural steel frame previously erected on-site using a crane and secured with bolts and/or welds. This modular fabrication technique provides higher quality and reliability, shorter field erection time, and lower installed costs relative to the conventional PJFF fabrication approaches.

The quarter sections of the filter compartments are thus designed to maximize the structural welding and fabrication at the shop location, while keeping overall dimensions within the envelop required for over-the-road transportation. This modular fabrication technique reduces the number of steel parts requiring fabrication in the field to erect a large PJFF, thereby reducing the field erection labor costs and time to erect the PJFF. This approach also reduces the linear seal weld length required in the field to erect the PJFF. The modular design also maximizes shop welding, which is more reliable and less costly than welding in the field. The modular design of the PJFF maximizes shop-fabricated portions of the steel portions on the PJFF while minimizing expensive field welding and fabrication requirements. The modular design thus provides a unique solution to the problem of expensive field fabrication of PJFF designs that require extensive, expensive and time consuming field fabrication and welding.

In view of the foregoing, it will be appreciated that the present invention avoids the drawbacks of prior PJFF fabrication techniques and provides an improved modular technique for fabricating PJFF structures for coal-fired and other types of power plants. The specific techniques and structures for fabricating the modular PJFF, and thereby accomplishing the advantages described above, will become apparent from the following detailed description of the embodiments and the appended drawings and claims.

BRIEF DESCRIPTION OF THE FIGURES

FIG. 1 is an assembled perspective view of a PJFF for a coal-fired power plant.

FIG. 2 is an assembled perspective view of a row of compartments in the PJFF, each including four quarter section and an ash hopper.

FIG. 3 is an assembled perspective view of a compartment of the PJFF.

FIG. 4 is an exploded perspective view of the compartment.

FIG. 5 is an assembled perspective view of a quarter section of the compartment.

FIG. 6 is an assembled perspective view of an alternative quarter section of the compartment with a hopper portion attached.

FIG. 7 is a conceptual illustration of a quarter section of the compartment sized and loaded for road transported to a job site by truck.

DETAILED DESCRIPTION OF THE PREFERRED EMBODIMENTS

Figure 8:
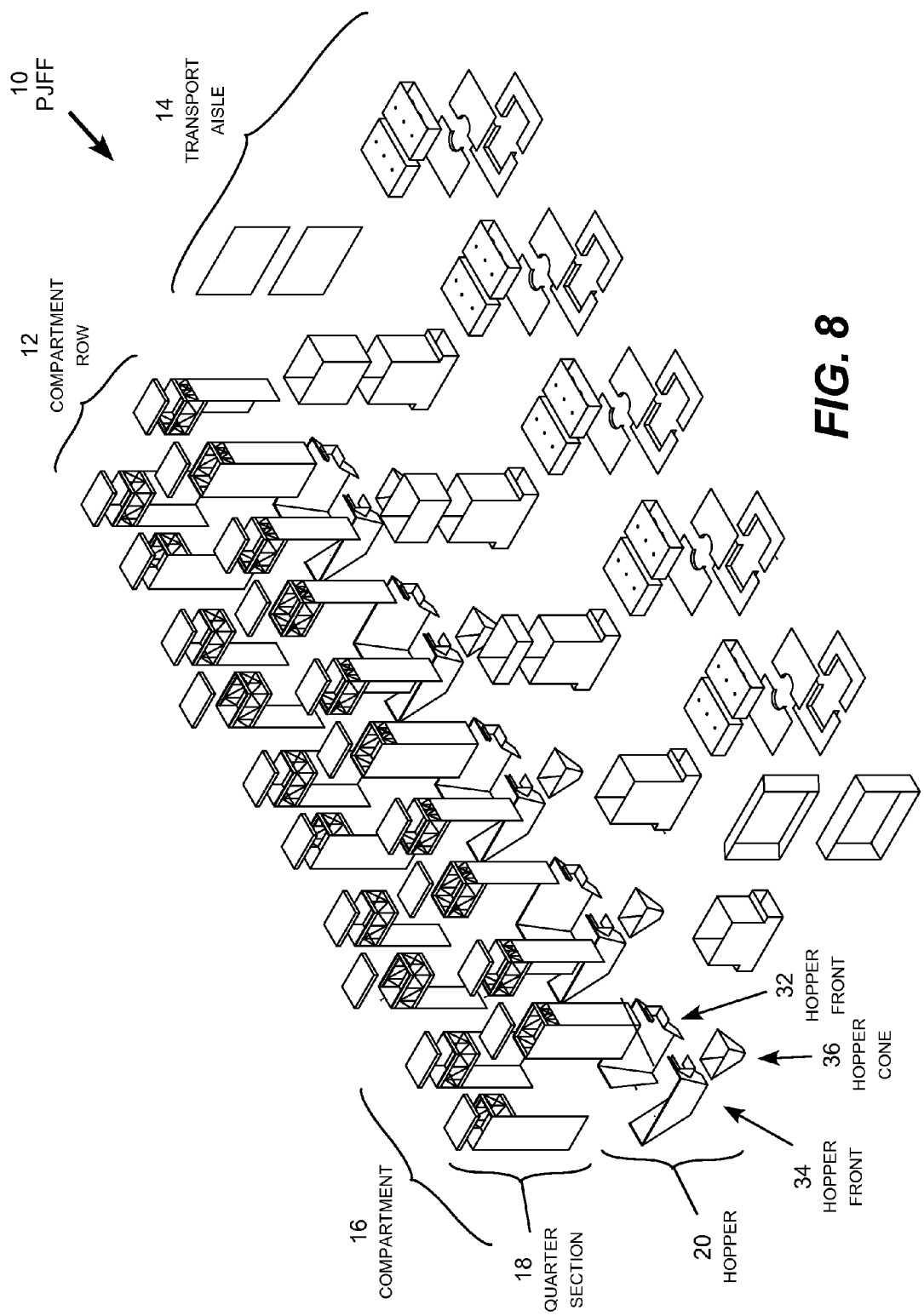
FIG. 8 is an exploded perspective view of a complete modular PJFF.

This invention may be embodied in a structure and fabrication technique for a modular pulse jet fabric filter (PJFF) for a furnace unit of a coal-fired or other types of power plant that produce heavy particulate loads in the flue gas. The modular PJFF can be used to provide more cost effective PJFF structures and fabrication techniques at both new and existing power plants including electric power generating stations and large process industries, such as pulp and paper, steel, petrochemical, cogeneration power boilers, and other industries requiring PJFF for air emissions. Although there are many different specific PJFF configurations, a representative PJFF for the purpose of illustrating the principles of the invention may include 10 compartments that each include 816 tubular filter bags, for a total of 8,160 in the complete PJFF.

The compartments are formed from "shop-fabricated" quarter sections, which are transported to the job site by truck over public roads. The quarter sections are specifically sized and designed for public road transport. If feasible, the hopper components are attached to the quarter sections at the shop. If this is not feasible, typically due to public road transportation length restrictions, the hopper is fabricated in road transportable sections and transported by truck to the job site. This design maximizes shop fabrication which provides higher quality fabrication and minimizes costly and time consuming field welding and erection of casing panels which the existing art utilizes.

FIGS. 1-8, shown approximately to scale, illustrate one example of the modular construction of the PJFF for a coal-fired power plant. The filters in this particular example may be 6 inches (15 cm) across and approximately 27 feet (9 m) long. Each filter compartment stands about 36 feet (12 m) tall with the completed PJFF structure standing on the order of 60 feet (20 m) to provide room for ducting over the filter sections. The completed structure may be on the order of 600 tons (544 metric tons). Other than the modular construction technique illustrated in these figures, the structure of the PJFF may be conventional and, therefore, will not be further described in this specification. It will also be understood that the modular design provided by the invention is independent of the internal configuration of the PJFF, such as the particular filters, ducting arrangement, ash disposal technique, and so for the. The modular fabrication technique may therefore be applied to conventional designs as well as modifications and alternatives developed in the future. It should further be appreciated that the invention is particularly well suited for retrofit of an existing power plant through the addition of PJFFs to improve emissions. For this type of project, the modular design achieves the important objectives of minimizing the disturbance to the power plant site and the time required to complete the construction.

FIG. 1 is an assembled perspective view of the example PJFF 10 provided to illustrate the invention. This particular PJFF includes two compartment rows 12 with an air transport aisle 14 located between the compartment rows. Each row includes a number of compartments 16, in this example there are 5 compartments per row for a total of 10 compartments in the PJFF. Each compartment typically includes hundreds of tubular filters, such as 816 filter bags per compartment for a total of 8,160 filter bags in the overall PJFF 10. FIG. 2 is an assembled perspective view of one compartment row 12, which includes 5 compartments in this particular example. FIG. 3 is an assembled perspective view of one compartment 12, which is formed from four quarter sections 18 forming a filer sub-assembly and a hopper sub-assembly 20.

FIG. 4 is a perspective view of the PJFF compartment 18 and FIG. 5 is an assembled perspective view of the compartment 16. The compartment includes the filter sub-assembly 40 that includes four quarter sections 18, and the hopper sub-assembly 20 that includes a hopper front component 30, hopper rear component 34, and a hopper cone 36. In this particular design, the hopper is formed from three components, and typically shipped separately from the filter quarter sections, to limit the overall length of the quarter sections to facilitate truck transportation over public roads. If road transportation permits, the hopper (potentially excluding the cone, which typically includes a valve for controlled release of accumulated particulates) may also be formed from quarter sections that are attached to respective quarter sections. FIG. 6 shows this alternative quarter section 18', in which a hopper quarter 38 is attached to the quarter section at the shop as part of the respective quarter section. This is the preferred approach, when road transport requirements permit, to further minimize the field assembly requirements at the job site.

In this particular example, the quarter sections 18 are rectangular, resulting in different left and right quarter sections (mirror images). Other than the fact that quarter sections in alternating compartments do not include front and rear walls to avoid duplication of walls between adjacent compartments, each left compartment is otherwise identical to form modular quarter sections. The right quarter sections are similarly modular. It will be appreciated that there will only be one modular quarter section in a design in which the compartment has a square cross-section. As shown in FIG. 7, each quarter section is sized for transport by truck 42 over public roads on a standard 53 foot (16 m) [or possibly shorter] trailer.

FIG. 8 is an exploded perspective view of the complete PJFF 10 (only one compartment 12 is shown). In this example, the entire PJFF is composed of road transportable components as shown in the figure. Each component of the PJFF is shop-fabricated and delivered to the job site requiring only bolts and seal welds to assemble in the field. Requiring no internal welds to the pre-assembled components at the job site greatly improved the quality of PJFF and the speed of assembly in the job site. As shown in the figure, the quarter sections of the compartments are the longest components. With these sections modularized and designed for transport by truck configured for public road access, the remaining components of the PJFF are readily designed for shop fabrication and road transport to the job site. The same PJFF design can also be utilized at multiple furnace units at the same power plant, and at multiple power plant sites, providing additional benefits from standardization, such as efficiency improvement, maintenance, and parts inventory benefits.

While particular aspects of the present subject matter have been shown and described, it will be apparent to those skilled in the art that, based upon the teachings of the invention, changes and modifications may be made without departing from the subject matter described herein and its broader aspects and, therefore, the appended claims encompass within their scope all such changes and modifications within the true spirit and scope of the described subject matter. As a result, the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. It is to be further understood that the invention is defined by the appended claims and equivalents. Although particular embodiments of this invention have been illustrated, it will be apparent to those skilled in the art that various modifications and embodiments of the invention may be made by without departing from the scope and spirit of the claimed invention. Accordingly, the scope of the invention should be limited only by the claims.

The invention claimed is:

1. A pulse jet fabric filter (PJFF) for a power plant having a furnace producing exhaust gas, comprising:
   a plurality of compartments, each compartment comprising opposed outer walls and opposed side walls enclosing a plurality of filter bags for removing particulates from the exhaust gas, each compartment further comprising a hopper for collecting and removing the particulates from the compartment;
   a first compartment comprising modular quarter sections, wherein each of the modular quarter sections of the first compartment comprises a portion of an outer wall and a portion of an adjacent side wall, wherein adjacent modular quarter sections are bolted and field welded to each other along an edge such that each of the outer and side walls of the first compartment comprises a portion of an outer or side wall from a first quarter section and a portion of an outer or side wall from a second quarter section,
   wherein each quarter section comprises a corner separate from the edge, wherein the corner comprises a shop weld.

2. The PJFF of claim 1, wherein the first compartment comprises two outer walls and two side walls, wherein each of the outer and side walls is rectangular and wherein the portion of the outer wall and the portion of the side wall of the modular quarter sections are each rectangular.

3. The PJFF of claim 2, wherein each of the outer and side walls of the first compartment has a height and a width, wherein the height of the outer and side walls is greater than the width of the outer and side walls.

4. The PJFF of claim 2, wherein the portion of the outer wall and the portion of the side wall of the modular quarter sections each have a height and a width, wherein the height of the portion of the outer wall and the portion of the side wall is equal to the height of the outer and side walls of the compartment, wherein the width of the portion of the outer wall is one half the width of the outer wall and wherein the width of the portion of the side wall is one half the width of the side wall.

5. The PJFF of claim 1, wherein the modular quarter sections are connected together by welding.

6. The PJFF of claim 1, wherein the hopper comprises a plurality of outer walls, a first opening at a first end adjacent the outer walls of the compartment and a second opening smaller than the first opening at a second end opposite the first end.

7. The PJFF of claim 1, wherein the hopper comprises four outer walls, wherein at least two opposing outer walls of the hopper comprise a first section from a first modular unit and a second section from a second modular unit connected together to form the outer walls.

8. The PJFF of claim 7, wherein all four of the outer walls of the hopper comprise a first section from a first modular unit and a second section from a second modular unit connected together to form the outer wall.

9. The PJFF of claim 1, wherein the PJFF comprises a first plurality of the compartments connected together in a row.

10. The PJFF of claim 1, wherein the PJFF comprises:
    a first plurality of the compartments connected together in first a row; and
    a second plurality of the compartments connected together in a second row;
    wherein the first row is spaced apart from the second row.

11. The PJFF of claim 1, further comprising a second compartment adjacent the first compartment, the second compartment having opposed outer walls, wherein the second compartment comprises modular quarter sections each of which comprises a portion of an outer wall of the second compartment, wherein modular quarter sections of the second compartment adjacent the first compartment are connected to adjacent outer walls of the first compartment along a first edge and to an adjacent modular quarter section of the second compartment along a second edge to form the opposing outer walls of the second compartment;
    wherein each of the outer walls of the second compartment comprises a portion of a first outer wall from a first quarter section and a portion of a second outer wall from a second quarter section and wherein the second compartment shares a sidewall with the adjacent first compartment.

12. The PJFF of claim 11, wherein the PJFF comprises a plurality of first compartments and at least one second compartment arranged in alternating fashion in a row, wherein the second compartments share side walls with adjacent first compartments.

13. The PJFF of claim 12, wherein the PJFF comprises:
    a first plurality of the compartments connected together in first a row; and
    a second plurality of the compartments connected together in a second row;
    wherein the first row is spaced apart from the second row.

* * * * *